United States Patent [19]

van der Graaf

[11] Patent Number: 4,459,066

[45] Date of Patent: Jul. 10, 1984

[54] FLEXIBLE LINE SYSTEM FOR A FLOATING BODY

[75] Inventor: Gerhardus C. van der Graaf, The Hague, Netherlands

[73] Assignee: Shell Oil Company, Houston, Tex.

[21] Appl. No.: 345,910

[22] Filed: Feb. 2, 1982

[30] Foreign Application Priority Data

Feb. 5, 1981 [NL] Netherlands ................... 8100564

[51] Int. Cl.³ ............... E02B 17/00; E02D 21/00; E21B 17/01
[52] U.S. Cl. .............................. 405/195; 405/202; 166/367
[58] Field of Search .............. 405/195, 202, 224; 166/366, 367; 137/236 S

[56] References Cited

U.S. PATENT DOCUMENTS

| | | | |
|---|---|---|---|
| 3,648,638 | 3/1972 | Blenkarn | 405/202 X |
| 4,031,919 | 6/1977 | Ortloff et al. | 405/224 X |
| 4,100,752 | 7/1978 | Tucker | 405/202 X |
| 4,198,179 | 4/1980 | Pease | 405/195 |
| 4,265,567 | 5/1981 | Nybo | 405/195 |
| 4,363,567 | 12/1982 | van der Graaf | 405/195 |

FOREIGN PATENT DOCUMENTS 2518604 11/1976 Fed. Rep. of Germany ...... 166/367

Primary Examiner—Cornelius J. Husar
Assistant Examiner—Nancy J. Stodola

[57] ABSTRACT

A multiple tube production riser system includes interconnected first and second sets of parallel tubes, each set of tubes being flexibly supported by a frame. The first frame is vertically suspended from a floating platform and allows a relative displacement between the tubes of the first set in a vertical direction. The second frame is inclined to the horizontal and allows warping of the second set of tubes.

8 Claims, 10 Drawing Figures

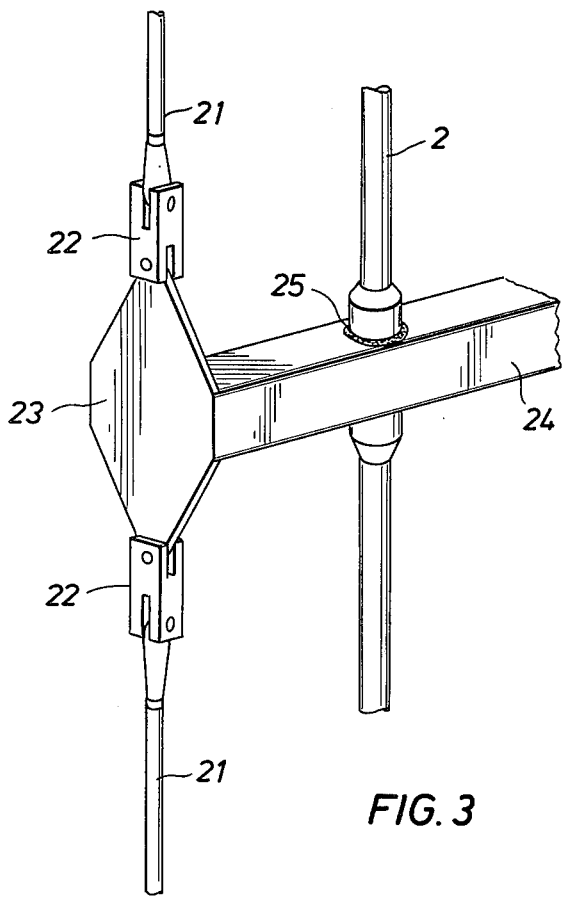
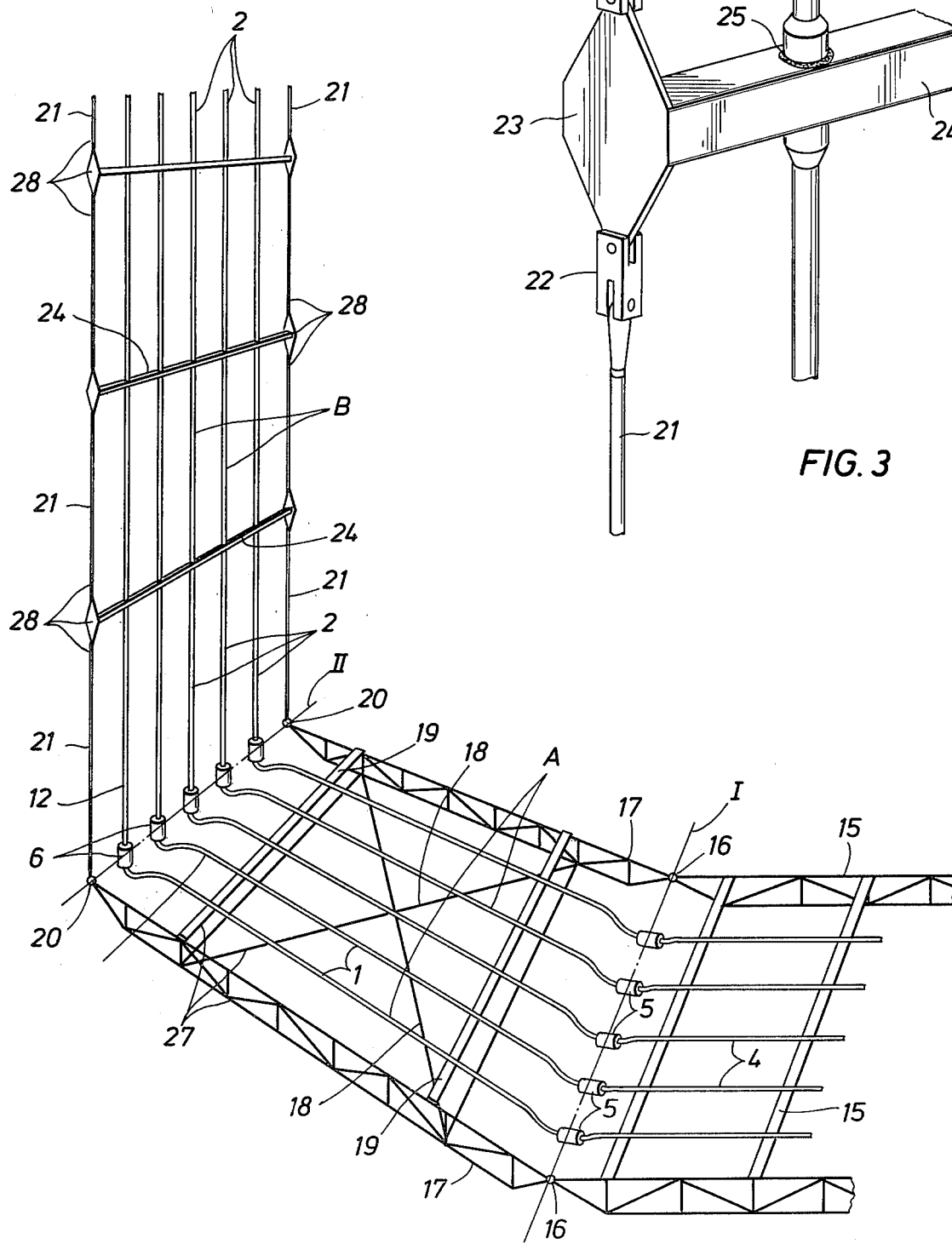
FIG. 2
FIG. 3

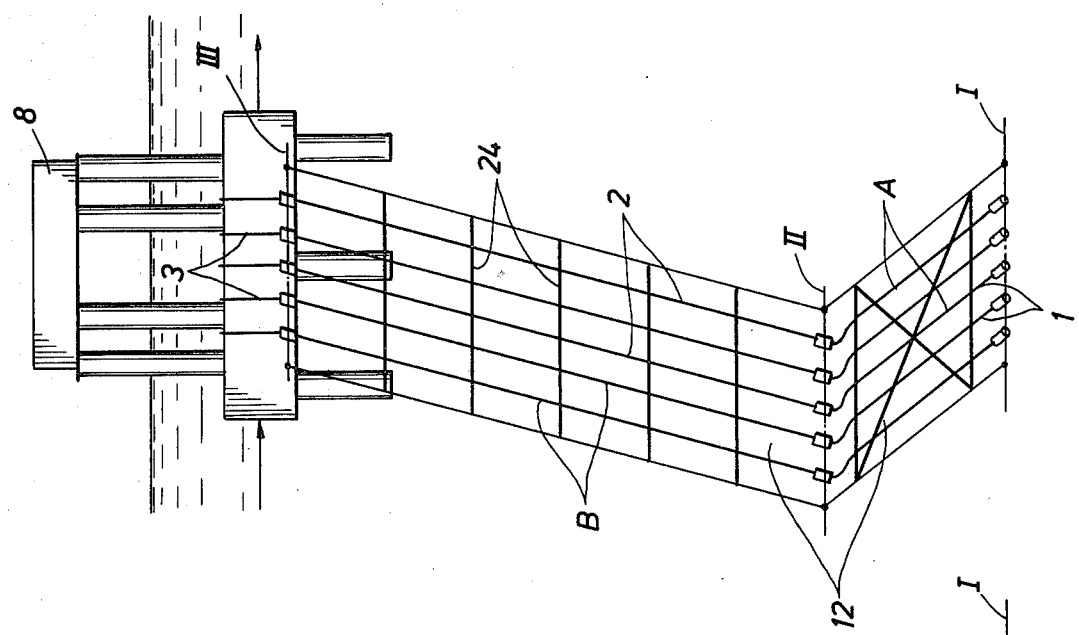
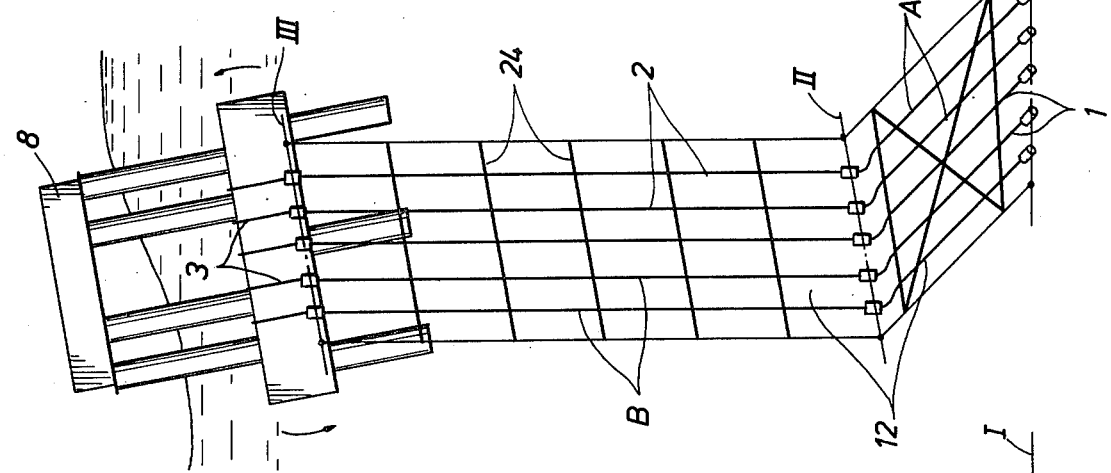
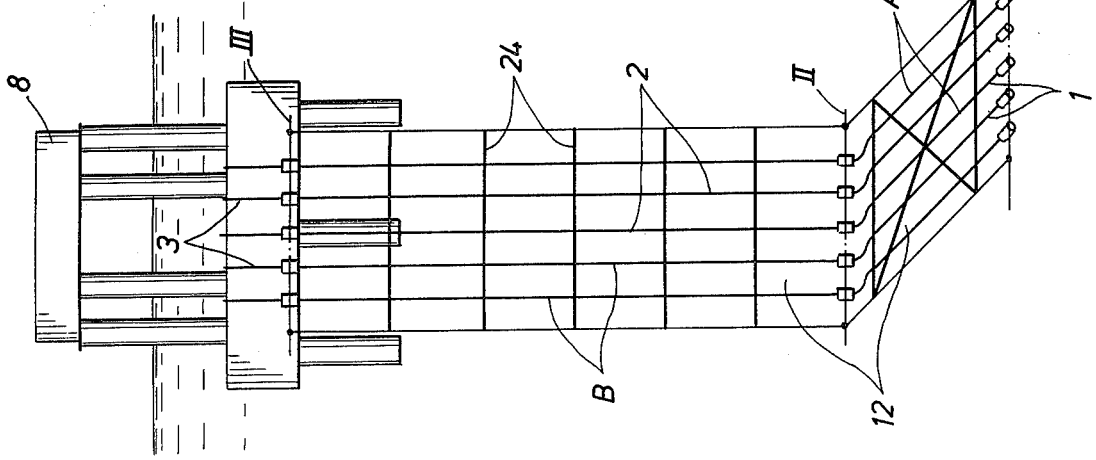

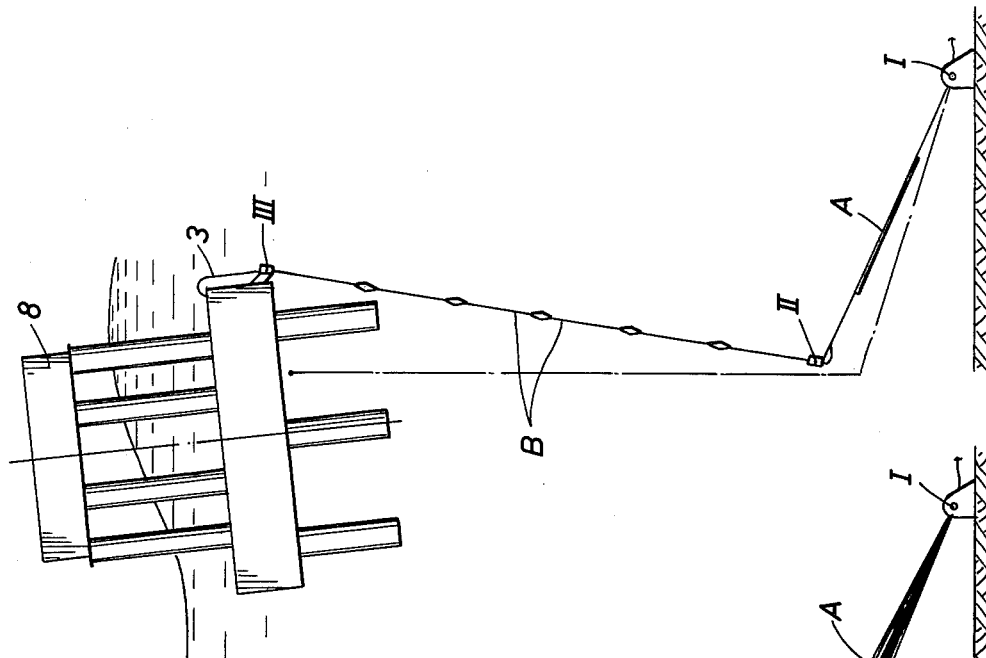
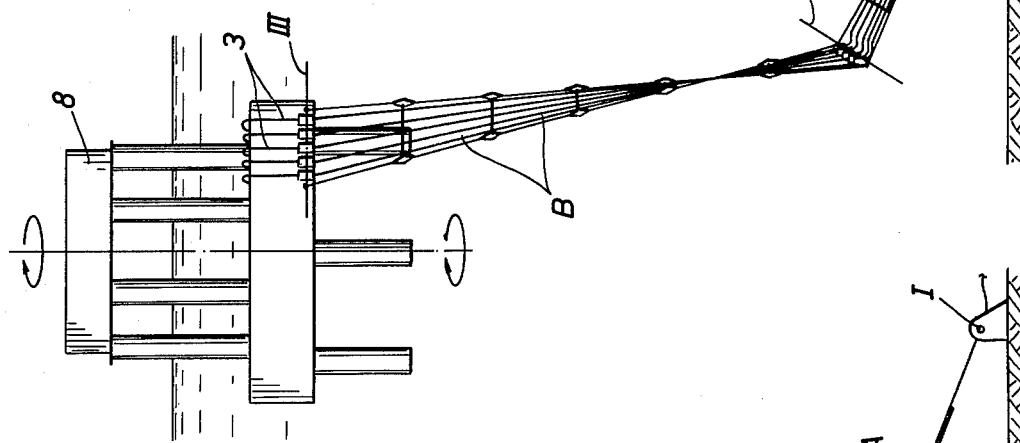
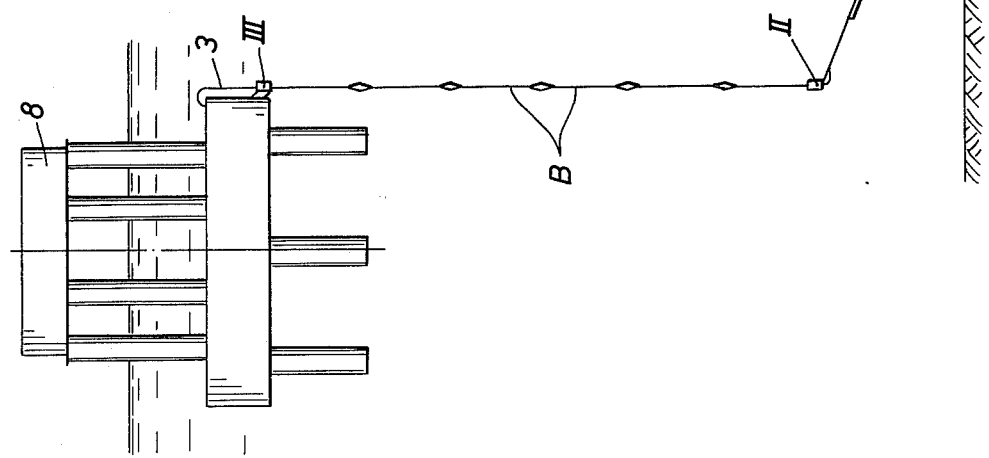

FLEXIBLE LINE SYSTEM FOR A FLOATING BODY

BACKGROUND OF THE INVENTION

The invention relates to a flexible line system for providing communication between the ends of transmission lines (such as pipelines or electric cables) situated on or close to the bottom of a body of water and the ends of similar lines situated on a body floating on the water surface.

When producing oil or gas from an underwater oil or gas field via a body floating on the water surface, such as a floating production unit or a floating loading unit, it is usually necessary to provide communication between the floating body and a plurality of transmission lines located on the bottom of the water. Examples of such lines are transport lines for oil or gas, measuring and control lines for operating underwater well equipment, signal lines for monitoring the oil and/or gas production, electric lines for supplying power to equipment, and pipelines for injecting water, steam, gas or chemicals into the wells.

Although the floating body is kept on location by means of anchor cables, it is not possible to prevent the floating body from moving as a result of wind, wave or current forces. This raises the problem of suitably connecting the lines located on the bottom of the water to the floating body that moves in relation to the bottom of the water.

SUMMARY OF THE INVENTION

The object of the invention is to provide a flexible line system forming a connection between a plurality of lines on the floating body and a plurality of lines on the bottom of the water, in such a manner that the floating body can freely move and the risk of damage to the lines as a result of such movement of the floating body is kept at a minimum.

To this end the line system comprises a first group of lines, which lines are at one end thereof connected to the ends of corresponding lines near the bottom of the water, the connections allowing a pivoting movement about a first substantially horizontal pivot axis, and which lines are at the other end thereof connected to the corresponding lines of a second group of lines, which group extends towards the floating body, these connections allowing a pivoting movement about a second substantially horizontal pivot axis; the first group of lines being of such torsionally flexible design that the second pivot axis can rotate with respect to the first pivot axis, the lines of the second group being pivotally connected to the floating body.

The lines of the second group may be pivotally connected to the ends of corresponding lines on the floating body, such that pivotal displacement about a third substantially horizontal pivot axis is allowed; the second group of lines being of such torsionally flexible design that the third pivot axis can rotate with respect to the second pivot axis.

In an attractive embodiment of the line system according to the invention the third pivot axis is substantially parallel to the second pivot axis, the lines of the second group running substantially parallel to each other in such a way that the point of intersection of the central axis of the two outer lines with the second and third pivot axes form the corners of a rectangle, the second group of lines being so deformable that the third pivot axis can move in its longitudinal direction with respect to the second pivot axis in such a way that said points of intersection then form the corners of a parallelogram.

In a suitable embodiment of the line system according to the invention the first group of lines is combined with a frame having a relatively low torsional rigidity, the ends of the frame being provided with pivots, the points of rotation of which being situated on the first and second pivot axes. In said embodiment the second group of lines is preferably provided with one or more tensioning devices substantially parallel to the lines of the second group of lines, which tensioning devices form a connection between the first group of lines and the floating body.

BRIEF DESCRIPTION OF THE DRAWING

The invention will be further described by way of example with reference to the drawing, wherein:

FIG. 2 shows, on a larger scale, a perspective view of part of a flexible line system according to FIG. 1.

FIG. 3 shows, on a larger scale, a perspective view of a detail on the second group of lines, which detail is ringed in FIG. 2.

FIG. 5 shows a diagrammatic perspective view of the flexible line system according to FIG. 1 and FIG. 2 seen in horizontal direction normal to the pivot axes.

FIG. 6 shows a diagrammatic perspective view of the flexible line system of FIG. 5 in deformed condition as a result of a rotation of the floating body about a horizontal axis.

FIG. 7 shows a diagrammatic perspective view of the flexible line system of FIG. 5 in deformed condition as a result of a horizontal translation of the floating body.

FIG. 8 shows a diagrammatic perspective view of the flexible line system in the same position as in FIG. 5, but seen in horizontal direction parallel to the pivot axes.

FIG. 9 shows the line system of FIG. 8 in deformed condition as a result of a rotation of the floating body about a vertical axis.

FIG. 10 shows the line system of FIG. 8, the third pivot axis being displaced in a direction normal to the third pivot axis.

DESCRIPTION OF A PREFERRED EMBODIMENT

Figure 1:
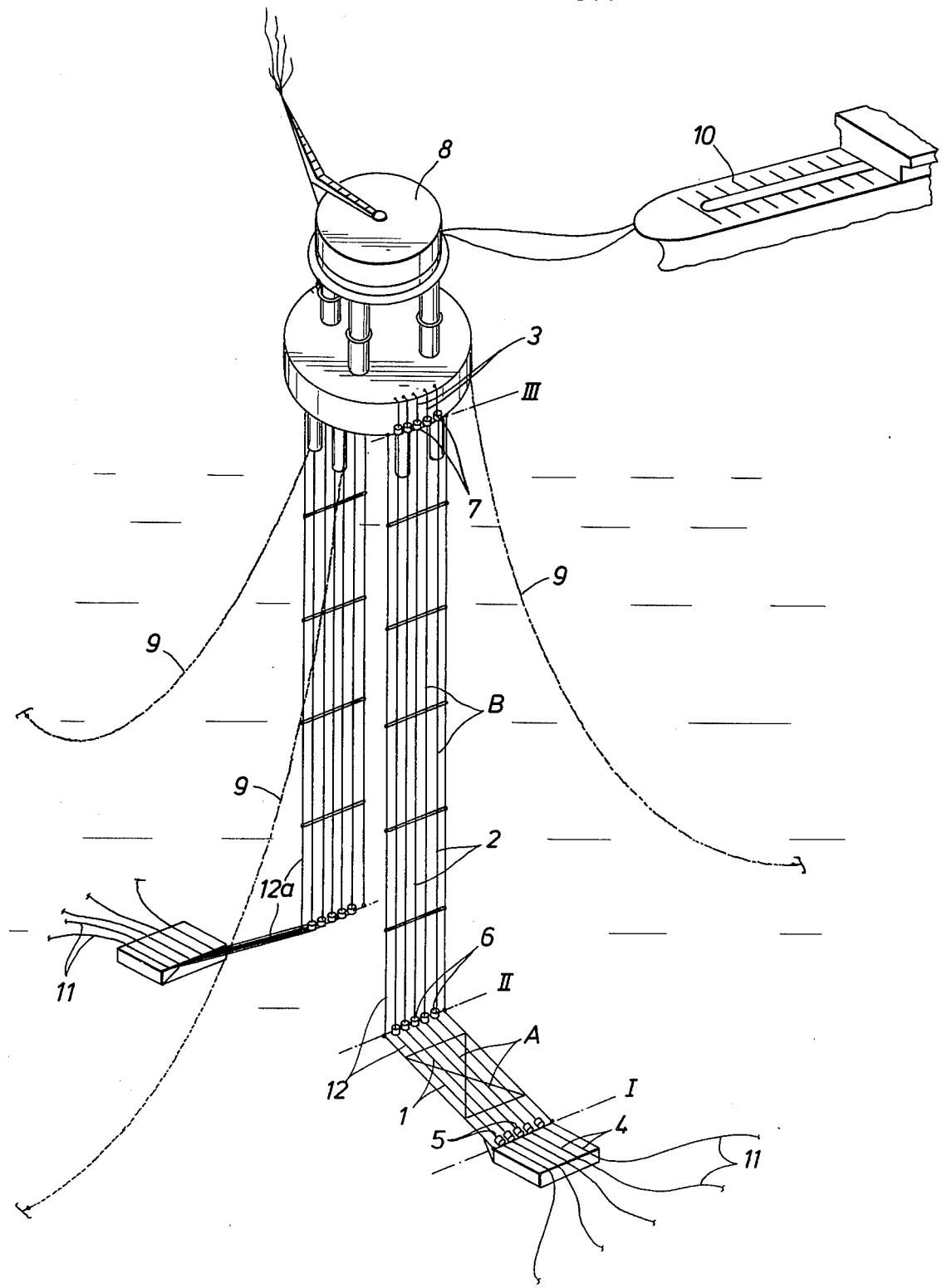
FIG. 1 shows a perspective view of a floating body that is connected to a number of lines located on the bottom of a water by means of two flexible line systems.

FIG. 1 shows a floating body in the form of a production unit 8, floating on the water surface and anchored to the bottom of the body of water by means of anchor cables 9. An export tanker 10 is moored to the production unit 8. The production unit 8 is connected to the lines 11 located on the bottom of the body of water by means of two flexible lines systems 12 and 12a.

The flexible line system 12 located at the front of the production unit 8 is of the same design as the flexible line system 12a located at the rear of the production unit 8. The first line system 12 will now be described. The line system 12 is built up of a first group A consisting of lines 1 and a second group B consisting of lines 2. At one end thereof, the line system 12 is connected by means of line ends 4 to a number of lines 11 located on the bottom of the water, whereas the other end of the system 12 is connected to the production unit 8 by means of line ends 3.

The lines 1 of the first group of lines A are at one end thereof connected to the corresponding line ends 4 that are situated near the bottom of the water, said connection being by means of flexible line couplings 5, which couplings are located on a first pivot axis I. Further, the lines 1 are at the other ends thereof connected to the corresponding lines 2 of the second group of lines B by means of flexible line couplings 6, which couplings are located on a second pivot axis II.

The lines 2 of the second group B are connected to the line ends 3 of the production unit 8 by means of flexible line couplings 7 located on a third pivot axis III.

FIG. 2 shows a detailed view of part of the flexible line system 12 of FIG. 1. In this embodiment the line ends 4 located near the bottom of the water are supported by a relatively rigid foundation frame 15 that is anchored to the bottom of the water. Two longitudinal girders 17 of a frame 27 that supports the first group A are connected to the foundation frame 15 by means of universal joints 16, the centre of rotation thereof being situated on the first pivot axis I.

The longitudinal girders 17 run parallel to the lines 1 of the first line group A and are substantially normal to the first pivot axis I. The longitudinal girders 17 are interconnected by crosswise arranged reinforcing elements 18 and by spacer members 19 transversely arranged in relation to the longitudinal direction of the longitudinal girders 17. The spacer members 19 are slidably and pivotally connected to the lines 1 of the first line group A. The ends of the spacer members 19 are slidably and pivotally connected to the longitudinal girders 17. The ends of the reinforcing elements 18 are pivotally connected to the longitudinal girders 17.

The longitudinal girders 17 are connected to tensioning rods 21 of the second line group B by means of universal joints 20, the centre of rotation thereof being situated on the second pivot axis II.

Linking elements 23, pivots 22 and the tensioning rods 21 form the tensioning devices 28 of the second line group B, which tensioning devices 28 are at one end thereof pivotally connected to the longitudinal girders 17 and are at the other end thereof pivotally connected to the floating body (FIG. 1) by means of universal joints 7, the centre of rotation thereof being situated on the third pivot axis III.

FIG. 3 shows the detail as ringed in FIG. 2, this detail being part of the second group of lines B of the flexible line system shown in FIG. 2.

Spacer members 24 are transversely arranged in relation to the longitudinal direction of the lines 2. The lines 2 are pivotally connected to the spacer members 24 by means of flexible connecting elements 25 allowing the lines 2 to pivot in all directions in relation to the spacer members 24.

The linking elements 23 are connected to the ends of spacer members 24. Further, the top and bottom ends of the linking elements 23 are connected to the tensioning members 21 by means of pivots 22 that are pivotal in all directions.

In the embodiment shown, the tensioning members 21 are in the form of rods, but, if desired, they may be replaced by cables or chains.

Figure 4:
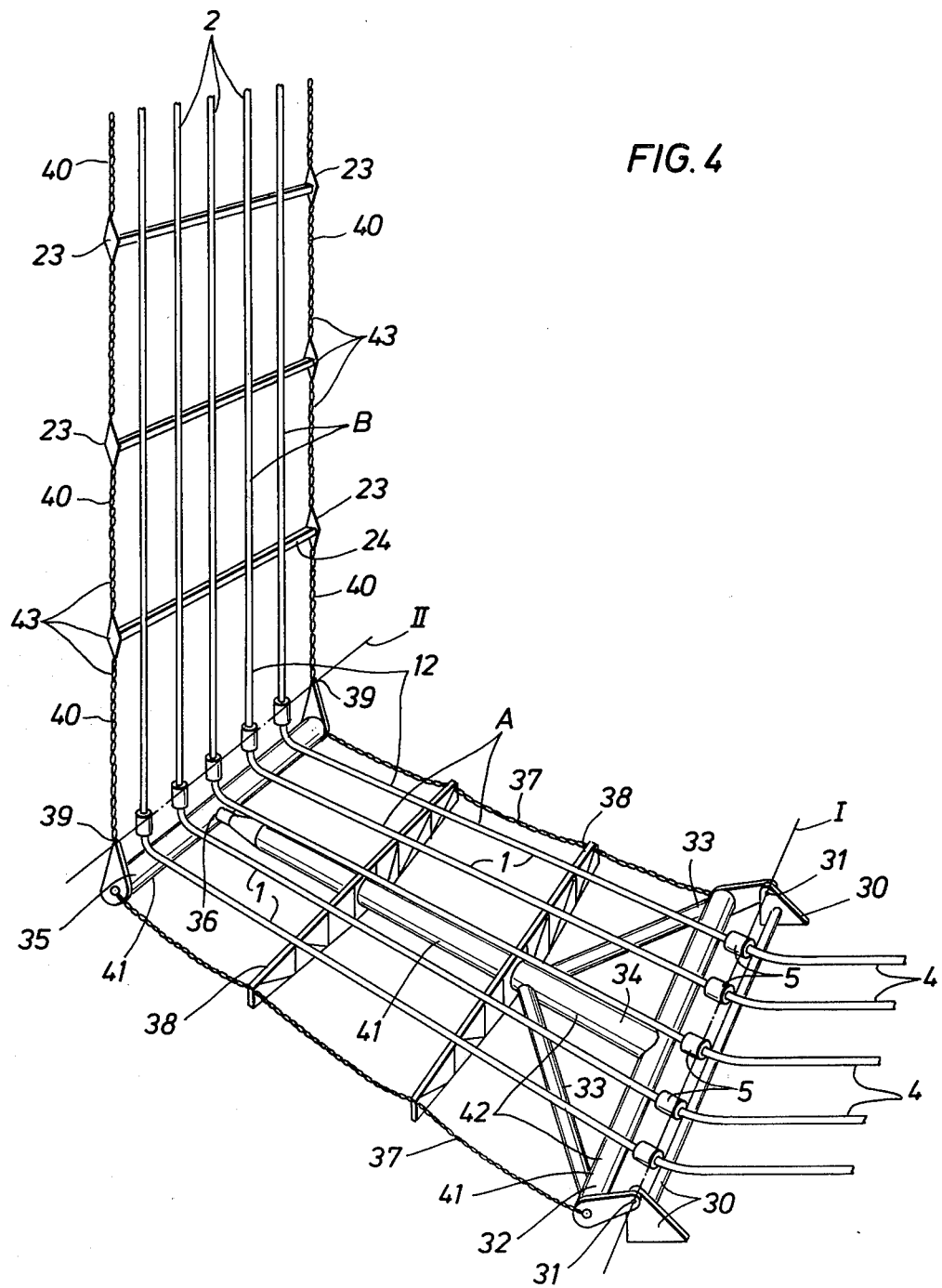
FIG. 4 shows, on the same scale as FIG. 2, a perspective view of another embodiment of part of the flexible line system.

FIG. 4 shows an alternative construction of the flexible line system 12. Herein, the lines of the first line group A are supported by an H-shaped frame 41 that is built up of a T-shaped element 42 and a transverse beam 35 connected thereto by means of a pivot 36.

The rigid T-shaped element 42 consists of a longitudinal beam 34 attached at one end thereof to a transverse beam 32. Beams 33 being provided for reinforcing the T-shaped element 42.

The transverse beam 32 runs parallel to the first pivot axis I and is connected by pivots 31 to a foundation frame 30 anchored to the water bottom. The pivot axes of the pivots 31 coincide with the first pivot axis I.

The longitudinal beam 34 runs parallel to the lines 1 of the first group A. The transverse beam 35 is connected to the other end of the longitudinal beam 34 by means of the pivot 36, the axis thereof being parallel to or conciding with the centreline of the longitudinal beam 34. Two chains 37 have been provided between the ends of the transverse beams 32 and 35, which chains are also connected to the ends of the spacer members 38 of the first group A. The two spacer members 38 are pivotally connected to the lines 1 of the first group A and to the longitudinal beam 34, the spacer members 38 being transversely arranged in relation to the longitudinal direction of the lines 1 of the first group A.

The transverse beam 35 runs parallel to the second pivot axis II and is pivotally connected to the tensioning devices 43 of the second line group B. The transverse beam 35 is connected to the tensioning devices 43 in a manner allowing each tensioning device 43 to pivot around a point 39 located on the second pivot axis II.

Together with the linking elements 23, chains 40 form the tensioning devices 43 of the second line group B, which tensioning devices 43 form a pivotal connection between the transverse beam 35 and the floating production unit 8. The upper ends (not shown) of the tensioning devices 43 which are connected to the floating production unit 8 are located on the third pivot axis III.

The linking elements 23 are attached to the ends of the spacer members 24 transversely arranged in relation to the longitudinal direction of the lines 2 of the second group B.

The spacer members 24 are pivotally connected to the lines 2 of the second group B in the same manner as shown in FIG. 3.

FIG. 5 shows a diagrammatic perspective view of the flexible line system of the type shown in FIGS. 1 and 2.

The first pivot axis I and the second pivot axis II are normal to the longitudinal direction of the lines 1 of the first group A in such a manner that said pivot axes I and II and the lines 1 are situated in a flat plane that is projected obliquely to the plane of the drawing.

The lines 2 of the second group B, the second pivot axis II, the third pivot axis III and the line ends 3 lie in the plane of the drawing.

The lines 2 of the second line group B run in vertical direction; the spacer members 24, the second pivot axis II and the third pivot axis III run in horizontal direction.

The situation shown in FIG. 5 occurs when the production unit 8 is in smooth water.

FIG. 6 shows a diagrammatic perspective view of the flexible line system shown in FIG. 5 but in the situation wherein the third pivot axis III has been rotated about a horizontal axis normal to the plane of the drawing. This situation will arise when the production unit 8 starts rolling owing to the wave action of the water in which the production unit 8 is floating. The second line group B will then be deformed into a parallelogram.

The angular displacement of the second pivot axis II in relation to the fixed first pivot axis I can take place because the first group of lines A is torsionally flexible.

FIG. 7 shows a diagrammatic perspective view of the flexible line system of FIG. 5, in a position wherein the production unit 8, together with the third pivot axis III, has been displaced in horizontal direction and in the longitudinal direction of the pivot axis III. Owing to this displacement, the second group of lines B is being deformed into a parallelogram. The first group of lines A is not deformed as the second pivot axis II remains horizontal and parallel to the first pivot axis I during said displacement. Owing to the decrease in vertical distance between the second and third pivot axis II and III, the first group of lines A will rotate around the first pivot axis I.

FIG. 8 shows a diagrammatic perspective view of the flexible line system of FIG. 5, seen in horizontal direction parallel to the three pivot axes I, II and III. In this view the pivot axes are visible as the pivot points I, II and III. This situation occurs when the production unit 8 is in smooth water.

FIG. 9 shows the line system of FIG. 8 in deformed condition as a result of a rotary displacement of the production unit 8 around a vertical axis of rotation. Such displacement originates from yawing of the production unit 8. As a result of such displacement, the second pivot axis II is rotated with respect to the first pivot axis I and the third pivot axis III is rotated with respect to the second pivot axis II, while the first group of lines A and the second group of lines B are being deformed. Such deformation of the groups A and B is allowed by the torsionally flexible design of the groups.

FIG. 10 shows the line system of FIG. 8 in a position wherein the third pivot axis III has been displaced in a direction normal to the pivot axis III owing to the movement of the production unit 8. When being displaced, the first and second group of lines A and B and the line ends 3 rotate around the three pivot axes I, II and III. It will be appreciated that the line groups A and B are not deformed during this displacement.

It will be obvious that in practice the displacements shown in FIGS. 6, 7, 9 and 10 will be superimposed in various combinations depending on the displacement of the floating production unit 8.

I claim as my invention:

1. A mechanically-flexible line system for providing communication between horizontal ocean floor transmission lines having terminal ends situated on or near the bottom of a body of water and similar transmission lines having ends carried by a body floating on the water surface and anchored to the ocean floor by cables, said line system comprising:
    a first group of at least three parallel spaced-apart transmission lines, each line having two ends, the ends at one end of the group lying in the same plane and being operatively connected to a like number of transmission lines adjacent to the bottom of the water,
    a first group of at least three flexible line couplings securing the ends on one side of said first group of parallel lines to the terminal ends of the corresponding transmission lines adjacent to the bottom of the water, said couplings being positioned in said lines so as to fall along a substantially straight line taken across or transverse to the lines to form a substantially horizontal first pivot axis near the water bottom for said first group of lines,
    a second group of at least three parallel spaced-apart transmission lines substantially vertically-positioned having upper ends and lower ends and being equal in number to the lines in said first group of lines, said second group of lines extending from near the water surface to near the water bottom, at least three upper ends of the second group of lines lying in the same plane,
    a second group of flexible line couplings operatively securing the lower ends of said second group of lines to the corresponding uncoupled ends of said first group of lines, said couplings being positioned in said lines so that the second group of couplings fall along an imaginary substantially straight line taken across or transverse to either group of lines to form a substantially horizontal second pivot axis between said first and second group of lines,
    a third group of flexible line couplings operatively securing the upper ends of said second group of lines to the ends of corresponding lines on the floating body, said couplings being arranged to form a substantially horizontal third pivot axis between said second group of lines and the lines on the floating body, and a support frame attached to the first group of lines, said frame having a relatively low torsional rigidity, the ends of said frame being provided with pivots independent of any of said couplings, the points of rotation of which being situated on the first and the second pivot axes,
    the frame comprising at least two longitudinal girders that are substantially parallel to the lines of the first group of lines, which longitudinal girders are pivotally connected with one another by reinforcing members that are arranged crosswise.

2. The flexible line system of claim 1 wherein at least one of said groups of flexible lines connected to said second group of flexible line couplings is arranged in a torsionally-flexible design whereby the second pivot axis can rotate in the body of water with respect to one of the other pivot axes.

3. A flexible line system as claimed in claim 2, wherein the third pivot axis is substantially parallel to the second pivot axis, the lines of the second group running substantially parallel to each other, in such a way that the points of intersection of the central axes of the two outer lines, together with the second and third pivot axes, form the corners of a rectangle, the second group of lines being so deformable that the third pivot axis can move in its longitudinal direction with respect to the second pivot axis in such a way that said points of intersection then form the corners of a parallelogram.

4. A flexible line system as claimed in claim 1, wherein the support frame is H-shaped and is built up of a T-shaped element and a transverse beam pivotally connected thereto.

5. A flexible line system as claimed in claim 1, including spacer members that are transversely arranged in relation to the longitudinal direction of the lines of a group, the lines being pivotally connected to the spacer members, said spacer members arranged at spaced intervals along the entire length of the lines.

6. A flexible line system as claimed in claim 1, wherein the second group of lines is provided with at least one tensioning device that is substantially parallel to the lines of the second group, which tensioning device forms a connection between the first group and the floating body.

7. A flexible line system as claimed in claim 1, wherein each tensioning device comprises a series of tensioning elements that are pivotally connected with each other by means of linking elements attached to the spacer members, and each tensioning device is at one end thereof connected to the support frame of the first group of lines by means of a pivot located on the second pivot axis, the other end being connected to the floating body by means of a pivot located on the third pivot axis.

8. A flexible line system as claimed in claim 1, wherein the lines of the first and second groups are substantially rigid lines and the rigid lines of the first group are at one end connected to the corresponding line ends near the bottom of the water and at the other end to the corresponding lines of the second group by means of flexible line couplings.